June 28, 1955 C. E. CHRISTOPHERSEN 2,711,572
BAND CLAMP COUPLER MECHANISM
Filed May 4, 1953
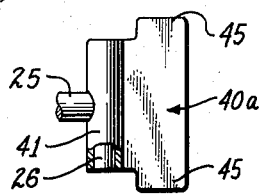
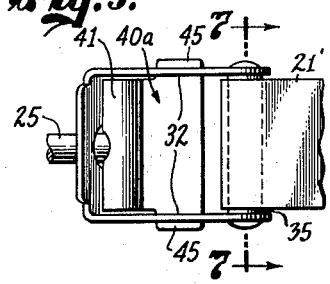
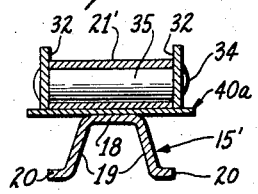
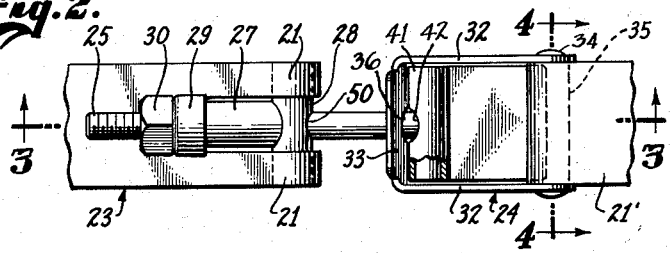
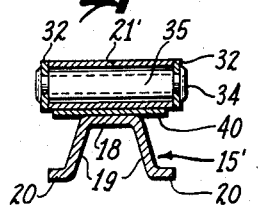
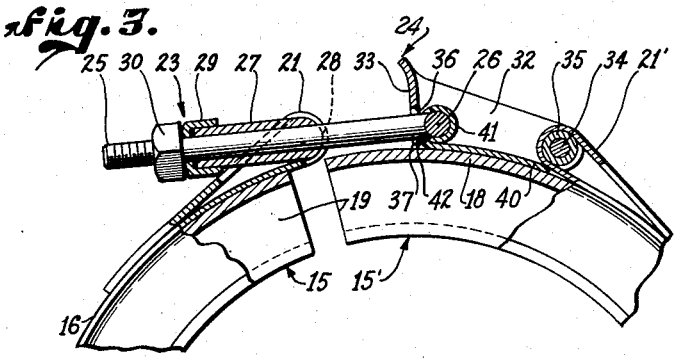
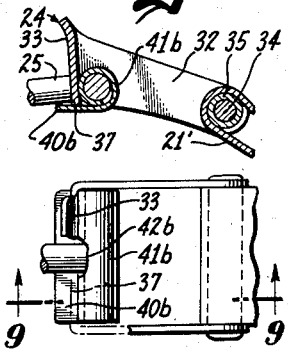
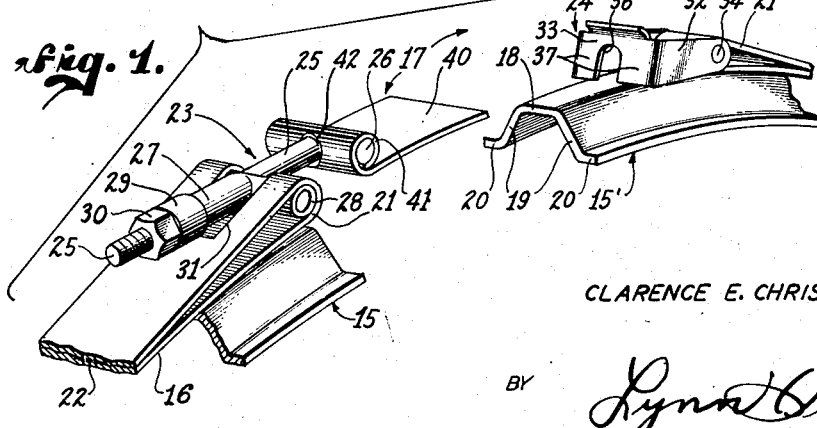
CLARENCE E. CHRISTOPHERSEN,
INVENTOR.
BY
ATTORNEY.

United States Patent Office 2,711,572
Patented June 28, 1955

2,711,572

BAND CLAMP COUPLER MECHANISM

Clarence E. Christophersen, Inglewood, Calif., assignor to Marman Products Company, Inc., Los Angeles, Calif., a corporation of California Application May 4, 1953, Serial No. 352,720

9 Claims. (Cl. 24—279)

This invention relates to band clamps of the split, flexible band type, utilizing a circumferential take-up connector mechanism for connecting and drawing together the ends of the band in order to tighten the band about an object encircled thereby. The invention is applicable to band clamps of the conventional "hose clamp" type, in which the flexible band consists simply in a length of flat ribbon or strap metal curled into an annulus; it is equally adaptable to band clamps of the type wherein one or more flange retainer segments of V-channel section are attached to the inner wall of the clamping band and are adapted to embrace the flanges of tube sections to be coupled together. The invention relates particularly to band clamps having means for providing a quick-coupler latching connection between the ends of the band, and wherein circumferential adjustment for take-up is provided for by a T-bolt having a head which is releasably engaged by a quick-coupler latch, the bolt being adjustably anchored to one end of the band and a latch having spaced claws for engaging the T-bolt head, being pivotally attached to the other end of the band.

In band clamps of the T-bolt and quick-coupled latch type, identified above, considerable difficulty is often experienced with the tendency of the T-bolt to rotate as the nut is cinched thereon in order to tighten the band. As tension develops in the band and the connector mechanism, the threads of the nut and bolt tend to seize and continued rotation of the nut tends to transmit rotation to the bolt. This may cause the head of the bolt to rotate in the latch, and to "walk" out of the slot between the claws of the latch, or to assume a position paralleling the slot, with only one arm of the T-bolt cross head engaging the latch, whereas the proper position of the T-bolt head is one lying transversely across the latch slot and securely engaged by both claws of the latch.

With the foregoing problems in mind, the general object of the present invention is to provide, in combination with the connector mechanism of this type of band clamp, a relatively simple means for effectively restraining the bolt from rotation with reference to the latch as the nut is cinched on the bolt.

A specific object is to provide this improvement in a form that is quite simple and inexpensive and does not interfere or detract from the ease of manipulation of the T-bolt and latch during the processes of coupling and uncoupling the ends of the band.

More particularly, the invention aims to provide, in combination with the T-bolt and quick-coupler latch type of band connector mechanism, a very simple rotation restraining element which is permanently attached to the T-bolt cross-head and is adapted to cooperate with other parts of the connector mechanism to restrain rotation of the T-bolt.

A further object is to provide such a rotation restraining device which is arranged to be clamped between a portion of the band clamp and an object encircled thereby in order to attain its function of restraining rotation of the T-bolt, or, in the V-band type of clamp, to be clamped between a portion of the connector mechanism and a V-channel restrainer segment of the clamp which is radially opposed to said portion of the band clamp.

Other objects will become apparent in the ensuing specifications and appended drawings in which:

Fig. 1 is a perspective view of a portion of a band clamp of the V-restrainer type, embodying the invention;

Fig. 2 is a plan view of the same;

Fig. 3 is a radial sectional view of the same, taken on the line 3—3 of Fig. 2;

Fig. 4 is a transverse sectional view thereof taken on the line 4—4 of Fig. 2;

Fig. 5 is a plan view of a portion of a band clamp embodying a modified form of the invention;

Fig. 6 is a fragmentary plan view of the rotation restrainer part of the clamp shown in Fig. 5;

Fig. 7 is a transverse sectional view of the clamp shown in Fig. 5, taken on the line 7—7 of Fig. 5;

Fig. 8 is a fragmentary plan view of a band clamp embodying another modification of the invention; and Fig. 9 is a radial sectional view thereof taken on the line 9—9 of Fig. 8.

*General description of band clamp*

Referring now to the drawings in detail, I have shown the invention as applied to a band clamp of the V-band or V-restrainer type, although, as previously noted, it is equally applicable to a simple band clamp of the type in which the band consists simply in a length of flat ribbon stock. In the V-band clamp illustrated, one or more V-restrainers consisting in circular segments of V-channel section material, indicated generally at 15 and 15' respectively, are attached to a constrictor band 16 of plain flat ribbon metal stock, the band 16 being circumferentially continuous except for two spaced ends which are joined by the connector mechanism of the present invention, said connector mechanism being indicated generally by the reference numeral 17 in Fig. 1.

The V-channel section of the V-restrainer segments 15, 15' includes a crown or peripheral web 18, a pair of radially inwardly diverging jaws 19 for wedging engagement with flanges on the ends of tube sections to be coupled, and a pair of reinforcing flanges 20 at the inner margins of jaws 19.

The gap in the constrictor band 16 is defined between loops 21, 21' which are formed by folding back the end portions of the band and securing them, as by riveting or welding (indicated at 22) to the body of the band. Linked to the respective loops 21, 21' are the components of the connector mechanism 17, namely, a T-bolt assembly designated generally by the numeral 23, and a latch assembly designated generally by the numeral 24.

The T-bolt assembly 23 includes the loop 21; a T-bolt having a threaded shank 25, a cross-head 26, and a nut 30; and a T-fitting including a tubular shank 27, a cross-head which consists in a pair of oppositely projecting trunnions 28, and an end cap 29 which is press-fitted on tubular shank 27. T-bolt shank 25 extends slidably through tubular shank 27. Nut 30 is threaded onto T-bolt shank 25 and engages against end cap 29 to slide the T-bolt shank 25 axially in the tubular shank 27. Trunnions 28 are journalled in respective sections of the loop 21, said sections being laterally spaced to define a slot 31 in which the tubular shank 27 is received. Tubular shank 27 may be in two sections, in order that the T-fitting may be fabricated as a sheet metal stamping, the end cap 29 functioning to secure the two sections of the tubular shank 27 together, being press-fitted thereon. End cap 29 also functions to provide a smooth bearing seat for nut 30. T-bolt shank 25 extends through an opening 50 in the head of the T-fitting (Fig. 2).

Latch assembly 24 includes the band 21' and also includes a latch in the form of a one-piece sheet metal stamping providing a pair of parallel side arms 32 joined at one end by an integral web 33 and joined at the other end by a cross pin 34 which is surrounded by a sleeve 35. Sleeve 35 is pivotally received in band 21' to establish the pivotal connection between the band and the latch 32, 33. In web 33 of the latch is a centrally disposed slot 36 which defines, on either side thereof, in the lower portion of web 33, a pair of claws 37 for hooking behind the T-bolt head 26, the slot 36 receiving the T-bolt shank 25.

By backing off the nut 30 so as to allow extension of the T-bolt toward the latch assembly 24, then lifting the latch 32, 33 and inserting the T-bolt head 26 therebeneath and with the area embraced by latch 32, 33, then swinging latch 32, 33 downwardly over T-bolt head 26, the claws 37 may be hooked behind the T-bolt head 26. Retaining the latch in this position, the nut 30 may then be advanced on T-bolt shank 25 to draw the T-bolt rearwardly until the clearance between the connector parts is taken up, whereupon the continued rotation of the nut 30 may be utilized to establish tension in the band. During this latter stage of cinching the band, the seizure of the nut threads against the bolt threads tends, in the conventional band clamp, to cause the T-bolt head 26 to rotate within latch 32, 33. This may result in the engagement of one arm of T-bolt cross-head 26 against web 33 immediately above slot 36, with the other arm aligned with the slot and therefore serving no useful function. The application of the full load to the narrow bridging portion of web 33 above the slot may result in bending the web 33 and thus deforming the latch 32, 33 to a more or less useless condition. Continued rotation of the bolt head in the latch may result in the T-bolt "walking" out of the slot 36 and causing the connector assemblies 23, 24 to separate, during the cinching operation.

The invention provides a simple but effective means to avoid these difficulties.

*The invention as disclosed in Figs. 1–4—preferred form*

As an example of a preferred form in which the invention may be embodied, I have shown in Figs. 1–4 inclusive a rotation restrainer tongue 40 the free end of which is adapted to engage beneath the end portion of loop 21' as indicated in Fig. 3. The opposite end of tongue 40 is rolled to form an integral sleeve 41 which encircles the T-bolt head 26. The T-bolt shank 25 extends through an opening 42 in sleeve 41, the opening 42 preferably being elongated circumferentially of sleeve 41 so as to provide for limited pivotal movement of tongue 40 relative to the T-bolt. Such pivotal movement may be utilized to accommodate the automatic adjustment of tongue 40 to the proper degree of angularity with reference to the longitudinal axis of the T-bolt shank 25, so that it may lie snugly against the crown 18 of the V-restrainer segment 15' lying beneath latch assembly 24. This is important for the reason that the same T-bolt and tongue assembly may be manufactured as a standard sub-assembly yet may be utilized in any of a dozen clamps of varying diameters and correspondingly varying peripheral curvatures. At the same time, the range of such movement is restricted so that the tongue 40 may be supported from T-bolt in a position projecting therefrom in the general direction of the axis of shank 25, so as to facilitate the manipulation of the tongue to a position beneath the latch 32, 33 without the necessity of directly grasping the tongue.

The sleeve 41 snugly encircles T-bolt head 26 with no appreciable clearance between the tongue and the T-bolt around the axis of shank 25, whereby the tongue, when clamped between the restrainer crown 18 and the loop portion 21' of latch assembly 24, will effectively restrain the T-bolt head 26 against rotation.

In the particular form of the invention under consideration, the tongue 40 may be slightly narrower than the space embraced between latch arms 32, so as to make it possible to fabricate the tongue 40 and the sleeve 41 of uniform width, from a section of ribbon or strap metal, without the necessity for indenting the sides of the tongue at any point. Accordingly, in this form of the invention, the tongue 40 is of uniform width and of sufficient length to extend substantially the full length of latch arms 32, whereby its free end will be received under the end of loop 21' in the latched position of the connector mechanism.

*The invention as disclosed in Figs. 5–7*

Figs. 5, 6 and 7 disclose how the invention may utilize a rotation restrainer tongue 40a having a width slightly less than the spacing between latch arms 32 at that side of the tongue which embodies the sleeve 41, and, at the free end thereof, may be widened to provide fingers 45 which project laterally sufficiently to be received beneath the latch arms 32. In this arrangement, as shown in Fig. 7, the tongue 40a is adapted to be clamped between the arms 32 and the crown 18 of the V-restrainer segment 15', and the tongue can be considerably shorter than in the previously described form of the invention, terminating short of the band loop 21'. The sleeve 41, and its connection to the T-bolt, may be the same as in the previously described form of the invention, and the same reference numerals are used to designate these parts.

*The invention as disclosed in Figs. 8 and 9*

Figs. 8 and 9 show how the invention may be embodied in a tongue 40b extending toward the threaded end of the bolt instead of away from it as in Fig. 1. In this arrangement, the tongue 40b is adapted to engage beneath the latch claws 37. Since the operative position of sleeve 41b is in immediate proximity to the inner surfaces of claws 37, the tongue 40b may be quite short as indicated in Fig. 8. Sleeve 41b varies from the sleeve 41 of Fig. 1 in that the aperture 42b is on the side of the sleeve from which the tongue 40b extends, and may in fact be simply an open notch.

The invention as shown in Figs. 1–4 is the preferred form for the reason that the loop 21' offers maximum resistance to radially outward yielding movement in response to torque transmitted through the tongue, for any given tension load in the band.

The inner wall of claws 37, which are adapted to engage against the head portion of the T-bolt assembly 23, is preferably inclined at an obtuse angle to the radially inner edges of latch arms 32, so that, in the application of tension between the T-bolt assembly and the latch, there is a tendency for the head portion of the T-bolt assembly to climb toward the bridging portion of web 33, i. e. toward the closed end of slot 36. Thus there is a small resultant of the tension load between the T-bolt and the latch, which tends to urge the latch radially inwardly against the V-restrainer segment 15' to securely maintain the latching connection. This is utilized in the modified forms of the invention, for applying pressure through the latch to the tongue.

The invention, in each of its several modifications, is particularly characterized by the simple and inexpensive fabrication of the tongue unit as a stamped and formed sheet metal part, with the sleeves 41, 41b in each instance being tangent to their respective tongues, whereby the sleeve may fully engage the inner walls of claws 37 while the tongue lies substantially in the plane of the radially inner edges of latch arms 32. It is of course essential that the bolt head and its encircling sleeve 41 be disposed entirely within the confines of the latch in order that adequate area of bearing engagement between the sleeve and claws 37, may be utilized.

I claim:
1. In a band clamp: a band; a T-bolt assembly at one end thereof; a quick-coupler latch assembly at the other end thereof; said T-bolt assembly comprising a pair of loop sections on one end of said band, said loop sections being spaced to define a slot, a T-fitting having a tubular shank received in said slot and having a cross-head comprising a pair of trunnions pivoted in said loop sections, and a T-bolt having a cross-head and having a shank extending through said tubular shank and a nut to engage said tubular shank; said latch assembly comprising a loop on the other end of said band and a latch one end of which is pivoted in said loop and the other end of which comprises spaced claws adapted to embrace said T-bolt shank and to hook behind said T-bolt cross-head; and a rotation restraining tongue having an integral sleeve snugly encircling said T-bolt cross head to connect said tongue to the T-bolt in non-rotatable relation to the axis of the shank thereof, said tongue being receivable between a portion of said latch assembly and an object encircled by said band, and being proportioned for engagement by said latch assembly portion on both sides of the said T-bolt shank axis, whereby to restrain the T-bolt from rotation about said axis.

2. A band clamp as defined in claim 1, wherein said tongue is substantially coextensive in length with said latch and has a free end portion adapted to engage beneath said loop.

3. A band clamp as defined in claim 1, wherein said latch includes a pair of spaced side arms each joined to the other at one end thereof by an integral transverse web in which said claws are embodied, and wherein said tongue and sleeve are of uniform width slightly less than the spacing between the latch side arms and said tongue is substantially coextensive with said latch in length and has a free end portion adapted to extend beneath the end of said loop.

4. A band clamp as defined in claim 1, wherein said latch comprises a pair of spaced side arms each integrally joined to the other at one end thereof by a transverse web in which said claws are embodied, the opposite ends of said side arms being pivotally joined to said loop; and wherein said tongue has a pair of fingers projecting laterally beyond the ends of said sleeve and engageable beneath said latch side arms.

5. A band clamp as defined in claim 1, wherein said latch comprises a pair of spaced side arms each integrally joined to the other at one end thereof by a transverse web in which said claws are embodied, the opposite ends of said side arms being pivotally joined to said loop; wherein said tongue has a pair of fingers projecting laterally beyond the ends of said sleeve and engageable beneath said latch side arms; and wherein said tongue and sleeve are integrally formed as a sheet metal stamping, with said sleeve being curled from one side of said tongue and tangent to the tongue.

6. A band clamp as defined in claim 1, wherein said latch comprises a pair of spaced side arms each integrally joined to the other at one end thereof by a transverse web in which said claws are embodied, the opposite ends of said side arms being pivotally joined to said loop; wherein said tongue has a pair of fingers projecting laterally beyond the ends of said sleeve and engageable beneath said latch side arms; and wherein said tongue extends from the T-bolt head in the same direction as and alongside the T-bolt shank, whereby it is adapted to be received beneath said claws and engaged by the radially inner edges thereof for restraining rotation of the T-bolt.

7. In a band clamp: a band; a T-bolt including a shank threaded at one end and a cross-head at the other end thereof; means providing a pivotally and longitudinally adjustable connection between said shank and one end of the band; a quick coupler latch one end of which is pivotally attached to the other end of the band, the other end of said latch being provided with laterally spaced claws for hooking behind said T-bolt cross-head; and a rotation restraining tongue of stamped ribbon metal including an integral rolled sleeve at one end thereof, snugly encircling said T-bolt cross-head, said tongue projecting beyond said sleeve to a length such that it is receivable beneath the pivotal connection of said other end of the latch to said band and an object encircled by the band, whereby to clamp said tongue in a manner to restrain rotation of said bolt, said sleeve being tangent to the body of said tongue, whereby said tongue may lie against the periphery of an object encircled by the clamp while said sleeve is fully engaged against the inner faces of said claws, said sleeve and tongue being of uniform width.

8. In a band clamp: a band; a T-bolt including a shank threaded at one end and a cross-head at the other end thereof; means providing a pivotally and longitudinally adjustable connection between said shank and one end of the band; a quick coupler latch one end of which is pivotally attached to the other end of the band, the other end of said latch being provided with laterally spaced claws for hooking behind said T-bolt cross-head; and the intermediate portion of said latch consisting in a pair of side arms integrally joined to said claws; and a rotation restraining part of stamped sheet metal including a tongue and an integral sleeve rolled from one end of the tongue and snugly encircling said T-bolt cross-head, the tongue being tangent to the radially inner side of said sleeve so as to lie substantially in the plane of the radially inner edges of said latch side arms while said sleeve projects radially outwardly therefrom and is engaged against inner faces of said claws, said sleeve having a length slightly less than the spacing between said side arms so as to be received therebetween, and said tongue including fingers projecting beyond the ends of said sleeve for engagement beneath said latch side arms.

9. In a band clamp: a band; a T-bolt including a shank threaded at one end and a cross-head at the other end thereof; means providing a pivotally and longitudinally adjustable connection between said shank and one end of the band; a quick coupler latch one end of which is pivotally attached to the other end of the band, the other end of said latch being provided with laterally spaced claws for hooking behind said T-bolt cross-head; and a rotation restraining part including a rolled sleeve snugly encircling said T-bolt cross-head and an integral tongue projecting tangentially from the radially inner side of said sleeve in a direction toward the threaded end of the T-bolt, for engagement beneath said claws, said tongue projecting a relatively short distance from said sleeve and having a width coextensive with the length of said sleeve, which is somewhat less than the spacing between said side arms whereby said sleeve may be received between said side arms and engaged against the inner faces of said claws while said tongue projects beneath and in engagement with the inner edges of said claws, for restraining rotation of said part and of said T-bolt.

References Cited in the file of this patent
UNITED STATES PATENTS
2,368,929  King  Feb. 6, 1945